March 5, 1957 W. H. NEELY 2,783,827
RUBBER PAD FOR UPHOLSTERED SPRING CONSTRUCTIONS
Filed March 8, 1952 2 Sheets-Sheet 1
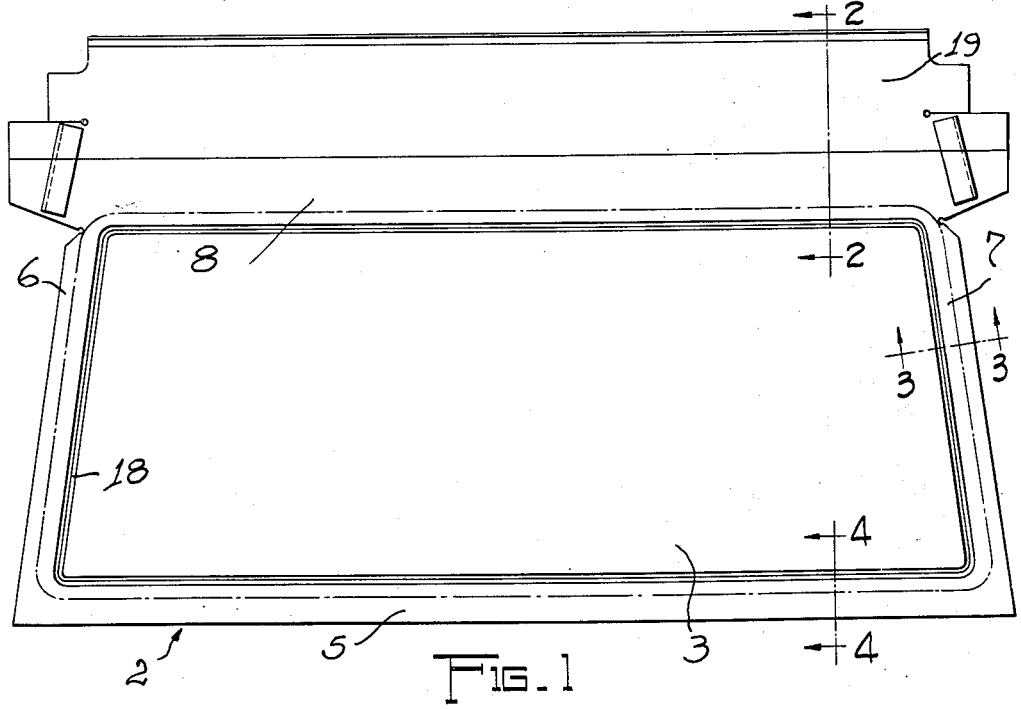
Fig. 1
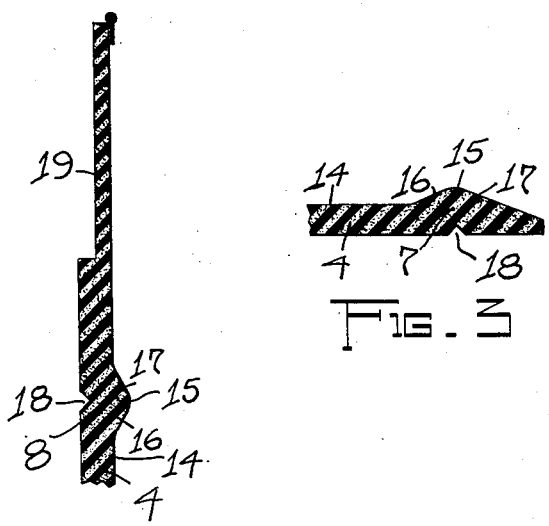
Fig. 2
Fig. 3
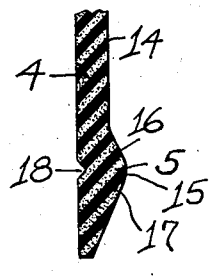
Fig. 4
INVENTOR.
WILLIAM H. NEELY
BY
ATT.

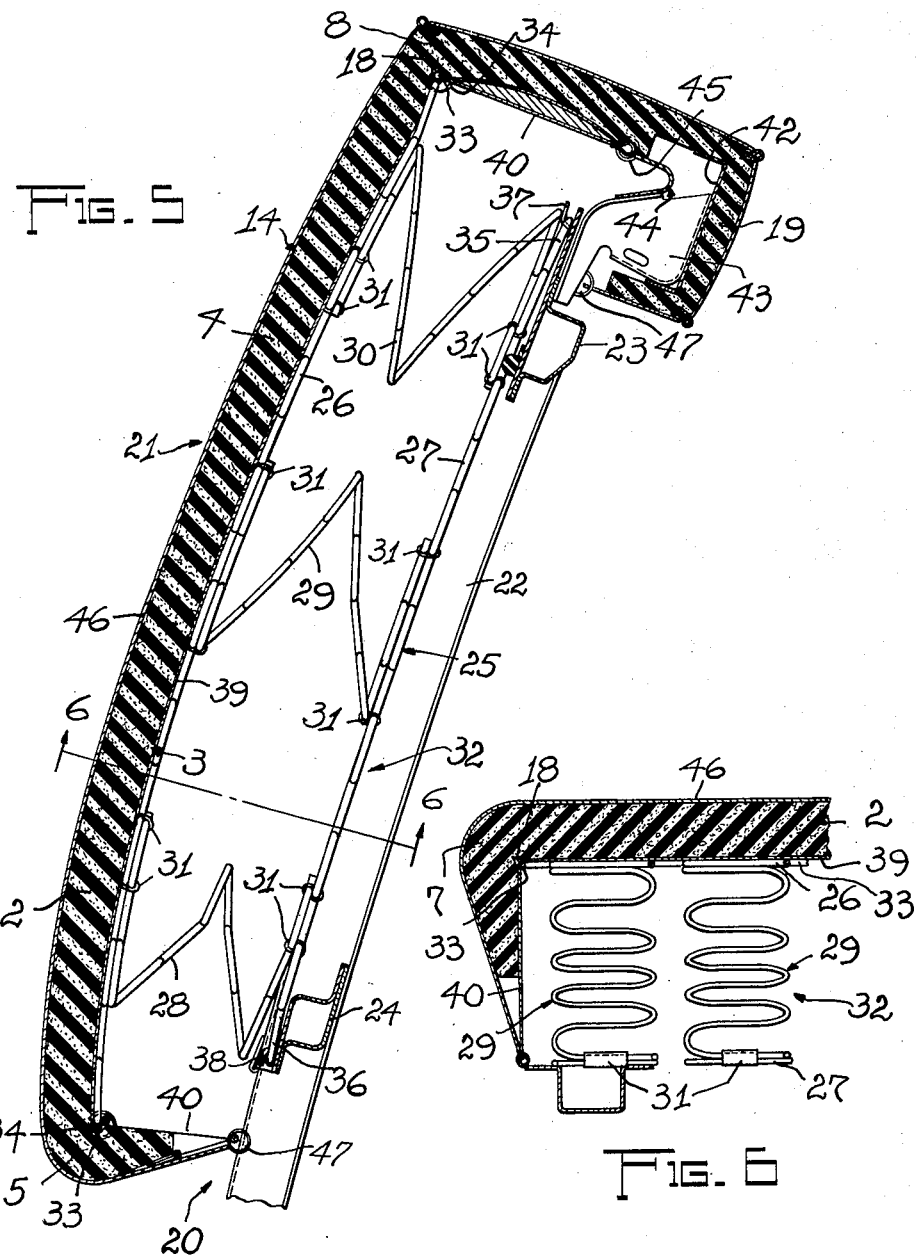

United States Patent Office 2,783,827
Patented Mar. 5, 1957

2,783,827

RUBBER PAD FOR UPHOLSTERED SPRING CONSTRUCTIONS

William H. Neely, Cleveland, Ohio, assignor to The Universal Wire Spring Company, Cleveland, Ohio, a corporation of Ohio Application March 8, 1952, Serial No. 275,484

4 Claims. (Cl. 155—179)

This invention relates in general to upholstered spring constructions such as used in vehicle seats, upholstered furniture and the like, and, more particularly, to soft rubber padded, upholstered spring constructions and design and construction of their soft rubber pads.

Soft rubber padded, upholstered spring constructions are now constructed with soft rubber pads having uniform thickness, the pads being mounted on prepared spring foundations, folded around the border edges of the spring foundations and attached to the springs or frames. In these upholstered spring constructions the soft rubber pads when placed and secured to spring foundations in the manner described, due to the texture of soft rubber, tend to thin out near the edges of the spring foundation where the rubber pads are folded over the border edge of the spring foundation. This thinning out of rubber pads is accentuated by trim tension applied to the outer cover when same is placed on the rubber, stretched thereover and attached to the frame.

The general object of the present invention is the provision of a soft rubber padded upholstered spring construction which includes a prefabricated soft rubber pad embodying a central portion of uniform thickness and folding portions increased in thickness over the central portion to prevent excessive thinning out of the rubber pad when folded around the spring construction.

Another object of the invention is the provision of a soft rubber padded upholstered spring construction which includes a prefabricated soft rubber pad embodying localized folding portions, the pad having its thickness increased in the folding portions to provide the rubber necessary for preventing in these folding portions excessive thinning out of the pad in excess of the other portions of the pad when placed on a spring construction folded around the edges thereof and subjected to trim tension by the cover member of the upholstered spring construction.

A further object of the invention is the provision of a soft rubber pad for soft rubber padded upholstered spring constructions which pad embodies portions of uniform thickness and localized folding portions increased in thickness over said first portions by protuberating the face of the pad in the folding areas on slanting planes inclined with respect to each other.

Still another object of the invention is the provision of a soft rubber pad for soft rubber padded, upholstered spring constructions which pad includes a central portion of uniform thickness, elongated folding portions arranged adjacent to said central portion and increased in thickness thereover by protuberating the face of the pad in the folding portions on slanting areas inclined with respect to each other, and elongated channel-like grooves in the opposite face of the pad aligned with the folding portions thereof for location of pad on a spring construction and gripping of the spring construction between the walls of the grooves when the pad is seated on the spring construction and folded around its edge.

Additional other objects and novel features of construction, combinations and relations of parts by which the objects in view have been attained will appear and are set forth in detail in the course of the following specification.

The drawings accompanying and forming part of the specification illustrate a certain practical embodiment of the invention, but it will be apparent as the specification proceeds that the structure may be modified and changed in various ways without departure from the true spirit and broad scope of the invention.

In the drawings:

Fig. 1 is a plan bottom view of a soft rubber pad constructed in accordance with the invention;

Fig. 2 is an enlarged fragmentary, sectional view through the pad shown in Fig. 1, the section being taken on line 2—2 of said figure;

Fig. 3 is another enlarged fragmentary, sectional view through the pad shown in Fig. 1, the section being taken on line 3—3 of said figure; and Fig. 4 is still another enlarged fragmentary, sectional view through the pad shown in Fig. 1, the section being taken on line 4—4 of said figure;

Fig. 5 is a longitudinal sectional view through the back of an automobile seat embodying a soft rubber padded spring structure including a soft rubber pad constructed according to the invention; and Fig. 6 is a cross sectional view through the structure shown in Fig. 5, the section being taken on line 6—6 of said figure.

Referring now more particularly to the exemplified form of the invention shown in the drawings, reference numeral 2 represents a soft rubber pad adapted to be seated on and attached to a wire spring construction. This pad, the bottom face 3 of which is shown in Fig. 1 of the drawings, includes a seating section 4 and bottom, side and top folding sections 5, 6, 7 and 8. Seating section 4 has uniform thickness throughout and is encircled by the bottom, side and top folding sections 5, 6, 7 and 8 having increased thickness over seating section 4 to facilitate proper folding of pad 2 around the edges of spring foundations, as will be later described. Bottom, side and top folding sections 5, 6, 7 and 8 have a thickness increased over the thickness of seating section 4 by protuberating the top faces of these sections out of the top face 14 of section 4 so that face 14 is encircled by a ridge-like rim 15 having inclined walls 16 and 17 and the rubber material necessary to prevent excessive thinning out of the folding sections when folded around the edges of a spring foundation. Folding sections 5, 6, 7 and 8 additionally include at their bottom faces, opposite the ridge-like rim 15, V-shaped groove means 18 which form an endless channel arranged and positioned to seat the edge wire structure of the spring foundation on which the pad is to be seated, groove means 18 closing around such edge wire structure and securely attaching the pad to the spring foundation when such pad is folded around the edges thereof.

Top folding section 8 of pad 2 additionally includes a section 19 extended therefrom and shaped to form the top face of a back seat cushion of an upholstered spring structure 20 of the type described hereinafter.

This upholstered spring structure, which is disclosed in Figs. 5 and 6 of the drawings, embodies the back 21 of a seat structure including upright channels 22 connected with each other by channeled cross members 23 and 24, which have mounted thereon side by side a plurality of elongated, sinuously corrugated wire spring structures 25. These wire spring structures are assembled from sinuously corrugated wire members each of which embodies an elongated top wire member 26, an elongated base wire member 27 somewhat shorter in length than the top-wire members, and connecting M-shaped spacing members 28, 29 and 30 of zig-zag configuration rigidly attached to the top and base wire members by clips 31. Wire spring structures 25 are assembled to spring construction 32 by means of an edge wire 33 which is connected to the top wire members 26 by clips 34 and is secured to said cross members 23, 24 by engaging the end loops 35 and 36 of base wire members 27 to hook-shaped portions 37, 38 on said cross members. Spring construction 32 which forms a spring foundation for upholstered spring structure 20 has extended over top wire members 26 of wire spring structures 25 a sheet 39 of insulating material secured to the edge wire 33 of spring construction 32 and has seated on insulating sheet 39 the previously described soft rubber pad in such a manner that the V-shaped groove means 18 of the rubber pad engage edge wire 33 of the spring construction 32. The thus seated pad has its bottom side and top folding sections 5, 6, 7 and 8 bent to extend toward the rear of spring construction 32 and secured to the frame structure which mounts spring construction 32 and by pliable connecting strips 40 is coupled with the ends of top wire members 26 to avoid excessive compression of the soft rubber pad 2 by trim tension as will be later described. Bending of the bottom, side and top folding sections in the manner described effects tight gripping of edge wire 33 between the walls of V-shaped groove means and flattens out these sections in their bending areas to the thickness of the seating section of the pad, there being sufficient material in the folding sections to insure uniform thickness throughout the pad without the customary artificial build-up in such bending areas.

Top section 8 of pad 2 has its section 19 folded around a U-shaped cross member 42 which is supported by brackets 43 secured to cross member 23. Brackets 43 additionally mount a V-shaped cross piece 44 which has attached thereto, by means of hog rings 45 upper connecting strip 40. The thus mounted soft rubber pad 2 is covered by an outer cover member 46 stretched over the pad and secured to the frame structure by means of hog rings 47.

Having thus described my invention, what I claim is:

1. In an upholstered spring structure a spring construction assembled from a plurality of wire springs connected by an upper edge wire member and a straight soft rubber pad stretched over the spring construction by bending the outer portions of the pad around the edge wire member of the spring construction, said straight soft rubber pad including a resting portion of substantially uniform thickness, outer folding portions having greater thickness than the thickness of the resting portion, and elongated channel means in the lower surface of said outer folding portions, said channel means having the edge wire member of the spring construction seated therein and frictionally gripping the edge wire member when the pad is stretched over the spring construction and has its outer folding portions bent around the edge wire member.

2. An upholstered spring structure as described in claim 1, wherein the increase of the thickness of the outer folding portions over the thickness of the resting portion is effected by protuberating a ridge-like elevation of somewhat triangular cross section above the surface of the resting portion, wherein said ridge-like elevation encircles the resting surface of the resting portion, and wherein the channel means have V-shaped cross section and extend parallel to the ridge-like elevation.

3. In an upholstered spring structure a spring construction assembled from a plurality of wire springs and a straight soft rubber pad stretched over the spring structure around the edges thereof, said straight soft rubber pad prior to its stretching over and around the spring construction including a resting portion having substantially uniform thickness throughout and folding portions with a thickness increased over the thickness of said resting portion, said soft rubber pad in stretched-around condition over the spring construction providing same with rubber padding having substantially uniform thickness in resting and folding areas.

4. An upholstered spring construction as described in claim 3, wherein the folding portions of the soft rubber pad are increased in thickness by ridge-like elevations protuberating from the top surface of the folding portions of the soft rubber pad.

References Cited in the file of this patent

UNITED STATES PATENTS

| 46,573 | Mitchell | Feb. 28, 1865 |
| 854,161 | Hale | May 21, 1907 |
| 2,184,572 | Wainess | Dec. 26, 1939 |
| 2,198,332 | Cravath | Apr. 23, 1940 |
| 2,308,964 | Saurer | Jan. 19, 1943 |
| 2,342,388 | Church | Feb. 22, 1944 |
| 2,459,758 | Flint | Jan. 18, 1949 |
| 2,514,214 | Flint | July 4, 1950 |
| 2,591,185 | Neely | Apr. 1, 1952 |

FOREIGN PATENTS

| 710,169 | France | June 1, 1931 |